3,377,301
VISCOSE SOLUTIONS MODIFIED WITH UNSATURATED ALDEHYDES, AND DERIVATIVES THEREOF
Paul H. Williams, Orinda, Calif., and Igor Sobolev, Morristown, N.J., assignors to Shell Oil Company, New York, N.Y., a corporation of Delaware
No Drawing. Filed Nov. 20, 1964, Ser. No. 412,823
13 Claims. (Cl. 260—17)

This invention relates to modified viscose solutions and products prepared therefrom. More particularly, the invention relates to a new class of viscose solutions modified with special unsaturated aldehyde polymers or derivatives, and to the improved products prepared therefrom.

Specifically, the invention provides new and particularly useful modified viscose solutions which may be utilized to form cellulose products having improved dry strength and flexibility. The new modified viscose solutions comprise a mixture of the viscose solution and a small amount of a polymer of an alpha,beta-ethylenically unsaturated aldehyde, such as acrolein, which polymer preferably has an intrinsic viscosity of at least 0.5, or a water-solubilized derivative of the polymer. The invention further provides cellulose products, such as improved rayon and cellophane products, prepared from the modified viscose solution.

Regenerated cellulose products, such as rayon and cellophane products, generally lack the dry strength needed for many applications. It is known, for example, that cellophane films are easily torn once the initial tear has been made. It is also known that the films are sometimes quite brittle and lack the softness required for certain uses.

It is an object of the invention to provide new modified viscose solutions. It is a further object to provide new modified viscose solutions that can be used to prepare cellulose products having improved dry strength. It is a further object to provide new modified viscose solutions which can be used to produce cellulose products having improved flexibility. It is still a further object to provide new modified cellulose products such as rayon and cellophane products. These and other objects of the invention will be apparent from the following detailed description thereof.

It has now been discovered that these and other objects may be accomplished by the new products of the invention comprising a mixture of a viscose solution and a small amount of a water-solubilized derivative of a polymer of an alpha,beta-ethylenically unsaturated aldehyde, such as acrolein, which polymer preferably has an intrinsic viscosity of at least 0.5. It has been found that the above-noted polymer derivatives have unexpected compatibility with the viscose solutions and give a mixture which has no significant increase in viscosity. When converted to regenerated cellulosic products as by conventional techniques, the resulting products have improved dry strength as well as improved flexibility. The resulting products are thus ideally suited for many applications such as cellophane wrappings, rayon fibers and films and the like.

The additives used in making the modified products include the alpha,beta-ethylenically unsaturated aldehyde polymers and water-soluble derivatives thereof. The alpha,beta-ethylenically unsaturated aldehydes used in making the basic polymers comprise those aldehydes having an ethylenic group in an alpha,beta-position relative to the aldehyde group, such as, for example, acrolein and alpha and beta-substituted acroleins, such as alpha-ethylacrolein, alpha - isobutylacrolein, alpha-chloroacrolein, beta - phenylacrolein, alpha-decylacrolein, alpha-cyclohexylacrolein and the like. Preferred aldehydes to be employed in making the polymers include the alpha,beta-monoethylenically unsaturated monoaldehydes containing 3 to 12 carbon atoms, and especially acrolein and the alpha and beta-substituted acroleins wherein the substituent on the alpha and/or beta-positions is an alkyl, cycloalkyl or aryl group containing no more than 8 carbon atoms. 2-alkenals containing up to 8 carbon atoms come under special consideration.

The basic polymer of the above-described aldehydes also includes copolymers and terpolymers of the said aldehydes with one or more dissimilar unsaturated compounds. Examples of such other monomer include other unsaturated aldehydes, such as methacrolein, other monomers as acrylonitrile, styrene, butadiene, isoprene, ethylene, propylene, butylene, alpha-methylstyrene, methacronitrile, vinylpyridine, vinylpyrrolidone, vinyl acetate, allyldiglycol carbonate, allylidene diacetate, triallyl cyanurate, diethyl fumarate, fumaronitrile, butyl methacrylate, ethyl acrylate, methacrylic acid, acrylic acid, acrylamide, vinyl 2-chloroethyl ether, vinyl butyl ketone, diallyl phthalate, and the like, and mixtures thereof. Such copolymers preferably contain from .5% to 55% by weight of the above-noted dissimilar monomers.

The homopolymers and copolymers of the unsaturated aldehydes can be obtained by a variety of methods. They may be obtained, for example, by treating the monomer composition containing the unsaturated aldehyde with free radical yielding catalysts, by use of redox polymerization systems, by the addition of ionic type polymerization initiators and the like. The polymerization also can be effected in bulk, solvent or aqueous or suspension systems.

Preferred methods for preparing the basic polymer are set out in Fischer, U.S. 3,079,357 and copending application Ser. No. 859,154, filed Dec. 14, 1959, and so much of the disclosure of these references relative to the preparation is incorporated herein by reference.

The preferred group of basic polymers include those obtained by above-noted addition polymerization through the carbon-to-carbon double bond, and have an intrinsic viscosity of at least .05 dl./g. and preferably 0.5 to 3.0 dl./g. (as determined by viscosity measurements using .5 N NaCl at 25° C.). The preferred polymers also are insoluble in water and possess a theoretical aldehyde function of over 95%, and preferably 97–99% or greater. By theoretical aldehyde function is meant that when the polymer is subjected to conventional test for presence of aldehyde groups (e.g., addition of hydroxylamine hydrochloride and titration of liberated water with Karl Fischer reagent) the results show that over 95% of the theoretical aldehyde groups present by addition polymerization at the double bond are present in the polymer as such or in hydrated form. Further analysis has shown that the polymer contains many groups wherein the aldehyde is in a hydrated form as

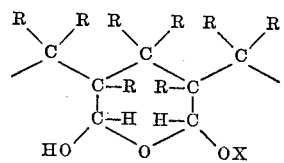

and

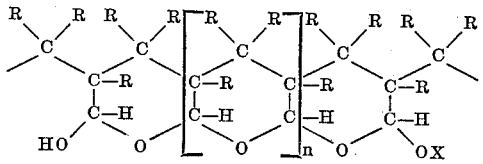

wherein $n$ is an integer from 0 to 5, $x$ is hydrogen, an acyl group or hydroxy containing radical (depending on the hydroxyl-containing material used in preparation of the polymer) and R is hydrogen or hydrocarbon and particularly alkyl, cycloalkyl and aryl radicals containing from 1 to 10 carbon atoms.

The water-soluble derivatives of the above-described water-insoluble polymers may be obtained by a variety of methods. They are preferably prepared by suspending the polymer in an aqueous solution containing the water-solubilizing agents, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various other means, such as addition of small amounts of acid catalysts or the addition of swelling agents such as acetone, tetrahydrofuran, and the like, may also be employed to assist in the dissolution.

The preparation of several solubilized derivatives is illustrated below.

Solubilized polymer A.—10 parts of polyacrolein having an intrinsic viscosity of 0.60 dl./g. was suspended in water so as to form a 10% slurry. $SO_2$ was bubbled into the solution at room temperature for about one hour. The container was sealed and stirred for 24 hours. After that time the polymer had dissolved. The dissolved polymer had an intrinsic viscosity of 0.60 dl./g. in 0.25 M sodium sulfate solution.

Solubilized polymer B.—10 parts of polyacrolein having an intrinsic viscosity of 1.1 dl./g. was suspended in water to form a 10% aqueous slurry. Sulfur dioxide was bubbled into the solution at room temperature for about one hour. The container was sealed and stirred for 24 hours. At that time, the polymer had gone into solution. This polymer had an intrinsic viscosity of 1.1 dl./g.

Solubilized polymer C.—10 parts of polyacrolein having an intrinsic viscosity of 1.47 dl./g. was suspended in water to form a 10% aqueous slurry. 5 parts of sodium bisulfite was added and the mixture kept at room temperature. The mixture was stirred for several hours until the polymer had gone into solution. This polymer had an intrinsic viscosity of 1.47 dl./g.

The above-noted water-soluble derivatives of the polymers will have substantially the same molecular weight as the basic water-insoluble polymer. In the case of the sulfur dioxide and bisulfite used in the dissolution, the polymer will also contain a plurality of free sulfonic acid groups or water-soluble salt sulfonate groups contained in the polymer molecule and the product may therefore be regarded as a polymeric polysulfonate metal salt, respectively. For example, the polymer will contain

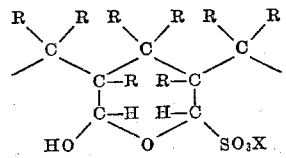

groups, wherein the R is as described above and X is hydrogen or alkali metal.

Another group of solubilized derivatives are those obtained by reacting the above-described polymers of the unsaturated aldehydes or their sulfur dioxide-containing derivatives with a basic material, and preferably one having a dissociation constant greater than $2.0 \times 10^{-5}$, and still more preferably an alkali metal hydroxide. Examples of such materials include sodium, potassium and lithium and ammonium hydroxide and basic salts. The pH value of the reaction mixture is preferably between about 8 and 14. When expressed on a normality basis, it is preferred to use reaction media having a normality greater than 0.1 N and preferably between 0.5 N and 10 N.

The degree of alkalinity employed will vary depending on the degree of conversion of the aldehyde or hydrated aldehyde groups to hydroxyl and carboxyl groups. Theoretically, one mole of caustic is needed for every two aldehyde groups converted. To obtain high degrees of conversion, such as 70 to 90% conversion, solutions of higher normality should be employed, while for the lower conversions lower normality may be utilized.

The reaction may be accomplished in an aqueous medium or in an inert solvent medium, such as in alcohol and the like. Best results, however, are obtained when conducted in an aqueous medium.

Dilute solutions or suspensions of the polymer are preferred. The concentration of the polymer in the reaction mixture will preferably vary from about 0.01% to 5% and more preferably from 0.1% to 4%.

The temperature employed in the reaction will generally range from about 0° C. to as high as 60° C. Preferred temperatures range from about 15° C. to 50° C. Atmospheric, subatmospheric or superatmospheric pressures may be utilized as desired.

In most cases, the polymers will dissolve in the alkaline medium in a few minutes and the reaction should be complete in the matter of a few hours. Reaction times generally vary from about 20 minutes to about 50 hours.

The products prepared by the above method are water-soluble and possess a variety of structural units as

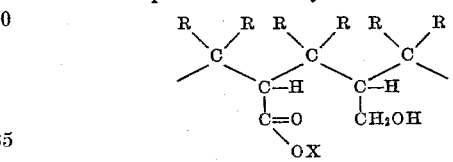

wherein R is hydrogen or alkyl and X is a metal, and preferably one of the water-soluble type, present in the basic material used to prepare the product.

A preparation of the polymer derivative by the above-noted method is illustrated below:

Solubilized polymer D.—12.0 parts of polyacrolein having an intrinsic viscosity of 1.0 dl./g. was stirred with 550 parts of water and 550 parts of 1 N NaOH. After stirring for several hours, the solid polymer dissolved to form a thick aqueous solution.

The viscose solutions used in making the claimed compositions may be prepared by any suitable method. A preferred method comprises treating cellulose pulp, such as cotton linters, wood pulp or other suitable forms of cellulose with a strong solution of sodium hydroxide, usually of 15% to 20% concentration at a temperature between 15° C. and 20° C. The excess caustic solution is pressed out and the treated product is allowed to age for several days. It is then treated in a suitable mixing apparatus with carbon disulfide, with the resulting formation of sodium cellulose xanthate. This is dissolved in a solvent such as caustic soda solution to form a viscose solution. This solution is aged until it reaches the desired degree of ripening. The solution is then ordinarily pumped into a coagulating bath (containing coagulants such as sulfuric acid, etc.) which coagulates the cellulose xanthate and forms the desired regenerated cellulose product.

The amount of the above-described polymer or derivative to be added to the viscose solution may vary over a wide range. In general, the amount of the polymer will vary from about .1% to 10% by weight of the solution. Preferred amounts vary from about 0.2% to about 8%.

The polymer or derivative is preferably added to the viscose solution after it has been allowed to ripen, but it can be added at any time after its formation. The polymer or derivative may also be added with the coagulant. The addition may be made by merely adding the polymer or derivative per se or a solution thereof to the viscose solution or by using the additive in combination with the coagulant. The addition can be made at any temperature but is preferably made at or near room temperature.

The resulting viscose solution containing the added polymer is then subjected to conventional coagulation techniques to form the desired regenerated cellulose product. Coagulants that may be used for this purpose include the acids, such as sulfuric acid, hydrochloric acid and the like.

The viscose solutions may be used to prepare a variety of products, such as filaments, cellulose films, coatings, plastic products, and the like. The formation of such products can be by the conventional techniques generally used for the formation of such regenerated cellulose products.

To illustrate the manner in which the invention may be carried out, the following examples are given. It is to be understood, however, that the examples are for the purpose of illustration and the invention is not to be regarded as limited to any of the specific materials or conditions recited therein.

Example I

A viscose solution was prepared from a commercial cellophane grade dissolving pulp (Cellunier-P, a sulfite pulp manufactured by Rayonier, Inc.) by steeping 50 g. of the pulp in 18% NaOH for 1 hour and then pressing. The product was shredded, then aged at 20–22° C. for 69 hours. Sixteen grams of $CS_2$ was added, the mixture stirred and then evacuated. Then 85 grams of 18% NaOH and 382 grams of water was added, and the mixture again stirred. The resulting viscose solution contained about 7% cellulose, 6% NaOH and 2% total sulfur. This was allowed to ripen for 24 hours at 22–25° C. to a 2.5 salt index. One aliquot of this solution was then diluted with an equal amount of water. Another aliquot was diluted with an equal volume of an 0.5% solution of a sodium bisulfite polyacrolein adduct having an intrinsic viscosity of 1.0 dl./g. The resulting viscose solution thus contained 7% polyacrolein based on the weight of cellulose.

The above mixture was used to form cellophane films by wetting a flat glass surface with the viscose solution and then exposing it to excess regenerating solution at 50° C. The regenerant contained 10% sulfuric acid, 18% sodium sulfate, 1% zinc sulfate and 5% glucose. The regenerated films were washed, dried, conditioned and tested. The test indicated that the films had greatly improved strength over the unmodified cellulose product. The results are shown in the table below:

| Amount of Polyacrolein Derivative Added | Average Film Thickness, mils | Average Tensile Strength, lbs./in.$^2$ | Average Elongation, Percent |
|---|---|---|---|
| None-control | 1.1 | 27 | 1.0 |
| 7% on cellulose | 2.0 | 350 | 1.2 |

Example II

Example I is repeated with the exception that the solubilized polymer employed was solubilized Polymer A having an intrinsic viscosity of 0.60 dl./g. Related results are obtained.

Example III

Example I is repeated with the exception that the solubilized polymer employed was solubilized Polymer B. Related results are obtained.

Example IV

Example I was repeated with the exception that the polyacrolein-sodium bisulfite adduct (Polymer C) was added to the regenerating solution. A film of improved strength was obtained as illustrated by the results listed in the table below:

| Concentration of Polyacrolein Derivative in Regenerating Solution, Percent | Film Thickness, mils | Average Tensile Strength, lb./in.$^2$ |
|---|---|---|
| None-control | 1.1 | 27 |
| 1.0 | 1.1 | 280 |

We claim as our invention:

1. A composition comprising a viscose solution containing an additive of the group consisting of polymers of alpha,beta-ethylenically unsaturated aldehydes, sulfur dioxide-solubilized polymers of alpha,beta-ethylenically unsaturated aldehydes, and sodium bisulfite-solubilized polymers of alpha,beta-ethylenically unsaturated aldehydes.

2. A composition as in claim 1 wherein the additive is sulfur dioxide-solubilized polyacrolein.

3. A composition as in claim 1 wherein the additive is a sodium bisulfite-solubilized polyacrolein.

4. A composition as in claim 1 wherein the additive is a sulfur dioxide containing polyacrolein having an intrinsic viscosity of at least 0.6 dl./g.

5. A composition comprising a mixture of cellulose xanthate and sulfur dioxide-solubilized polyacrolein.

6. A composition comprising an aqueous caustic solution of cellulose xanthate and a polyacrolein solubilized with a sulfur dioxide-containing reactant.

7. A process for forming an improved regenerated cellulose product which comprises coagulating the viscose solution defined in claim 1 with an acid.

8. A process for forming an improved regenerated cellulose product which comprises coagulating the viscose solution defined in claim 2 with an acid.

9. A process for forming a regenerated cellulose product having improved strength properties which comprises coagulating a viscose solution containing a water-solubilized polymer of acrolein with an acid.

10. A regenerated cellulose product of the reaction product of viscose and a member of the group consisting of polymers of alpha,beta-ethylenically unsaturated aldehydes, sulfur dioxide-solubilized polymers of alpha,beta-ethylenically unsaturated aldehydes, and sodium bisulfite-solubilized polymers of alpha,beta-ethylenically unsaturated aldehydes.

11. A regenerated cellulose product of the reaction product of viscose and a sulfur dioxide solubilized polyacrolein.

12. A regenerated cellulose product of the reaction product of viscose and a water-solubilized sodium bisulfite-polyacrolein adduct.

13. A process for forming a regenerated cellulose product having improved strength properties which comprises coagulating a viscose solution with an acid containing a water-solubilized polymer of an alpha,beta-ethylenically unsaturated aldehyde.

No references cited.

WILLIAM H. SHORT, *Primary Examiner.*

J. NORRIS, *Assistant Examiner.*